July 12, 1955

J. M. TOLCHER 2,712,779

CAMERA SUPPORT

Filed Feb. 9, 1951

John M. Tolcher
INVENTOR.

BY

Attorneys

United States Patent Office 2,712,779
Patented July 12, 1955

2,712,779

CAMERA SUPPORT

John M. Tolcher, Denver, Colo., assignor of one-half to Fred C. Daiss and one-half to Ava Daiss, both of Englewood, Colo.

Application February 9, 1951, Serial No. 210,210

2 Claims. (Cl. 95—86)

This invention comprises novel and useful improvements in camera attachments, and more particularly pertains to a support for cameras, whereby a camera may be adjustably supported on the body of the photographer.

An important object of this invention is to provide a camera support having a body engaging member which is adjustably attached to the camera support in such a manner that the support may be mounted on either the shoulder or the side of the photographer.

Another important object of this invention is to provide a camera support, in accordance with the foregoing object, in which the camera may be adjusted relative to the body engaging member to facilitate the aligning of the camera view finder assembly, with the line of sight of the photographer using the camera.

Yet another object of this invention is to provide a camera support, in accordance with the foregoing objects, which is of simple and compact construction, and which can be readily collapsed to facilitate carrying.

An important feature of this invention resides in the provision of an L-shaped bracket and a longitudinally arcuate body engaging arm, with fastener means extending through the leg of the bracket other than that to which the camera is adapted to be attached, and through the arm, for angularly adjustably attaching the arm to the bracket for movement about an axis transverse the arm.

Yet another important feature of this invention resides in the provision of a camera support, in accordance with the foregoing feature, together with a camera support strap which is attached to the bracket, for angular and longitudinal adjustment relative to the leg of the bracket, other than that to which the body engaging arm is secured, together with fastener means on the end of the strap for angularly adjustably attaching a camera to the strap.

These, together with various ancillary objects and features are obtained by this device, a preferred embodiment of which has been illustrated in the accompanying drawings wherein.

Figure 1:
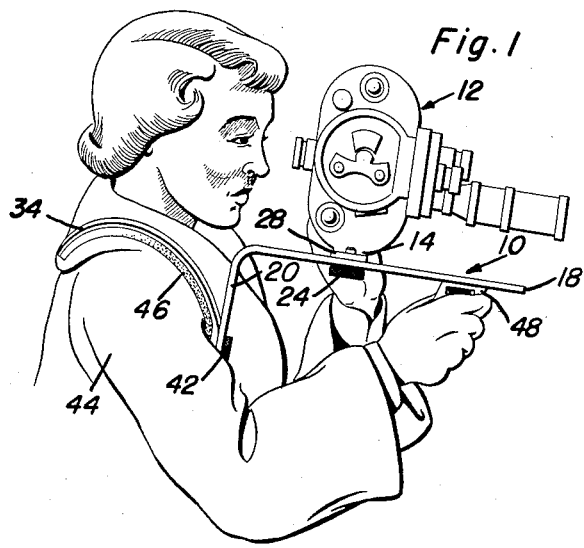
Figure 1 is a side elevationaal view of the camera support bracket showing the same in use.

Reference is now made more specifically to the accompanying drawings wherein the camera support, indicated generally by the numeral 10 is illustrated for use with a conventional camera 12 having an internally threaded boss 14, on the bottom thereof.

The camera support 10 includes an L-shaped bracket 16 having first and second legs 18 and 20 respectively. The leg 18 is provided with a longitudinally extending slot 22 which slidably receives a headed thumb screw 24, which screw is threadedly received in a bore 26 in a camera supporting arm 28, whereby the latter is longitudinally and angularly adjustably mounted on the first leg 18 of the bracket. A thumb screw 30 is slidably received in an elongated slot 32 which extends longitudinally of the arm 28, which thumb screw 30 extends into the internally threaded boss 14 on the camera 12, whereby the latter is angularly and lonigtudinally adjustably attached to the arm 28.

Figure 4:
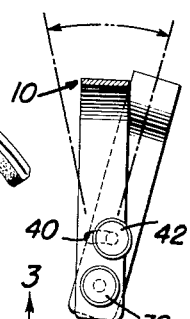
Figure 4 is a transverse sectional view, taken on the plane 4—4 of Figure 2.
Figure 3:
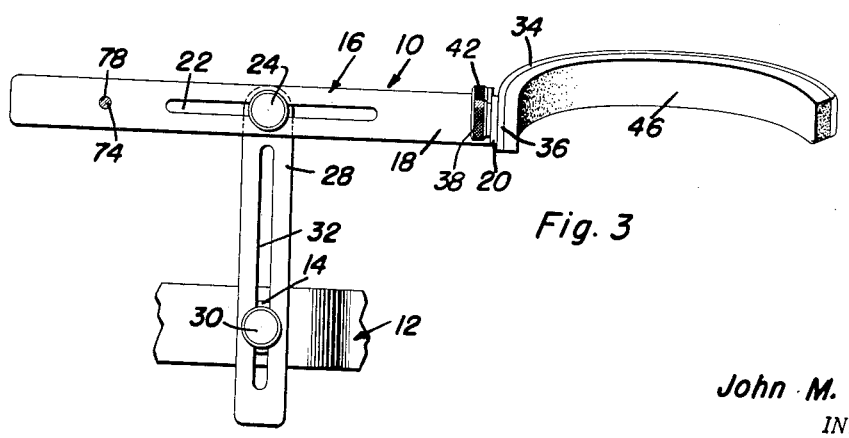
Figure 3 is a fragmentary horizontal sectional view, taken substantially on the plane 3—3 of Figure 2.

A longitudinally arcuate body engaging member 34 is provided with a substantially flat end portion 36 which is angularly adjustably attached to one end of the second leg 20 of the bracket 16, as by the thumb screw 38. The second leg of the bracket 20 is also provided with an arcuate guide slot 40, disposed concentric with the axis of the thumb screw 38, which slot slidably and guidingly receives the shank of a thumb screw 42, which latter thumb screw is threadedly received in the flat end portion 36 of the member 34. As will be appreciated from a consideration of Figure 4, the thumb screw 42 serves to adjustably lock the member 34 to the bracket 16, as when the camera support 10 is mounted upon the shoulder of the user 44, as is best shown in Figure 1. However, it is contemplated that the camera support also be used, when desired, with the arcuate member 34 in engagement with the side of the user, and in this case the thumb screw 42 is removed and the member 34 locked to the second leg 20 of the bracket 16, solely by the thumb screw 38.

As is apparent from the drawings, a resilient pad 46 is attached to the inner face of the arcuate member 34, as by a suitable adhesive, for obvious reasons.

Figure 5:
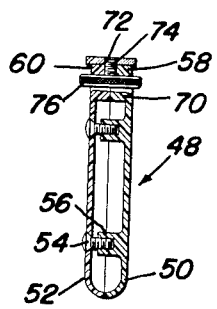
Figure 5 is a transverse sectional view of the camera support, taken on the plane 5—5 of Figure 2.
Figure 2:
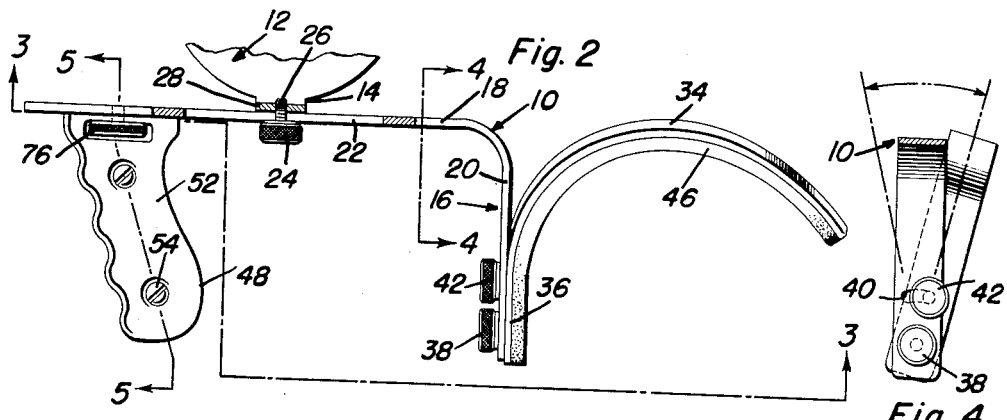
Figure 2 is a fragmentary side elevational view of the camera support having a camera mounted thereon, parts being broken away and shown in sections to illustrate details in construction.

A handle grip member 48, preferably formed of complementary half sections 50 and 52 is provided, the half sections being secured as by fasteners 54 which extend through suitable apertures in one of the half sections 52, and are threadedly received in internally threaded bosses 56, in the other of the half sections. Each of the half sections 50 and 52 of the handle grip 48 have a mounting plate 58 and 60, respectively, formed integrally with the sections, and spaced laterally from the upper walls 70 thereof. A bore 72 is formed in the continuous edges of the mounting plates 58 and 60, and slidably receives the shank 74 of a thumb screw, the head 76 of which is disposed between the plates 58 and 60, and the upper wall 70 of the hand grip 48. As is best shown in Figure 5, the shank 74 is threadedly received in a corresponding internally threaded bore 78 in the first leg 18 of the bracket, whereby the hand grip is detachably secured thereto.

When using the camera support 10 on the shoulder, the arcuate arm 34 is disposed so as to overlie the shoulder, and the first leg 18 of the bracket 16 is then adjusted relative to the member 34 so that the camera 12, carried thereby, will remain in proper relation relative to the horizontal. The thumb screw 42 is then tightened to lock the bracket and the arm in their adjusted position. In order to adjust the camera so as to obtain proper registry of the eye piece of the view finder, with the eye of the photographer, it is merely necessary to angularly and longitudinally adjust the camera 12 on the arm 28, as by the set screw 30, the position of the camera relative to the eye being adjusted by the thumb set screw 24 which is adapted to longitudinally slidably and angularly adjustably secure the arm 28 to the first leg 18 of the bracket.

As it is believed that the operation and construction of the device may be readily understood from the foregoing, further description is believed to be unnecessary. However, since numerous modifications will readily occur to those skilled in the art after consideration of the foregoing specification, and accompanying drawing, it is not intended to limit the invention to that shown and described, but all suitable modifications may be resorted to falling within the scope of the appended claims.

Having described the invention, what is claimed as new is:

1. A camera support comprising an L-shaped bracket having first and second legs, a longitudinally arcuate body engaging member angularly adjustably attached to said second leg of said bracket for movement about an axis perpendicular to said second leg of said bracket, a hand grip attached to said first leg of said bracket, an arm, means adjustable longitudinally of said first leg for angularly adjustably attaching said arm to said first leg, and means for angularly adjustable attaching a camera to the end of said arm remote from said bracket for movement about an axis transverse to said arm, wherein said last mentioned means is adjustable longitudinally of said arm.

2. A camera support comprising an L-shaped bracket having first and second legs, a longitudinally arcuate body engaging member, a fastener extending through one end portion of said first leg and through one end portion of said member for pivotally connecting said member to said bracket, said second leg having an arcuate slot therein concentric with said fastener, means extending through said slot for locking said member to said second leg in a predetermined angularly adjusted postion, and means for attaching a camera to the first leg of said bracket.

References Cited in the file of this patent
UNITED STATES PATENTS

| | | |
|---|---|---|
| 2,370,611 | Du Mais | Feb. 27, 1945 |
| 2,483,711 | Roos | Oct. 4, 1949 |
| 2,552,205 | Moss | May 8, 1951 |